United States Patent [19]
Wilson et al.

[11] Patent Number: 5,914,028
[45] Date of Patent: Jun. 22, 1999

[54] REFORMING PROCESS WITH CATALYST PRETREATMENT

[75] Inventors: Charles R. Wilson, San Francisco; Dennis L. Holtermann, Crockett, both of Calif.

[73] Assignee: Chevron Chemical Company, San Ramon, Calif.

[21] Appl. No.: 08/781,433

[22] Filed: Jan. 10, 1997

[51] Int. Cl.$^6$ .................................................. C10G 35/085
[52] U.S. Cl. ........................ 208/139; 208/134; 208/135; 208/138; 502/85; 502/521
[58] Field of Search ................................... 208/134, 135, 208/138, 139; 502/85, 521

[56] References Cited

U.S. PATENT DOCUMENTS

| | | | |
|---|---|---|---|
| 3,615,357 | 10/1971 | Wainer | 75/64 |
| 3,890,686 | 6/1975 | Caubert | 29/196 |
| 4,015,950 | 4/1977 | Galland et al. | 428/648 |
| 4,048,057 | 9/1977 | Murphy | 208/89 |
| 4,324,648 | 4/1982 | Roberts et al. | 208/114 |
| 4,681,865 | 7/1987 | Katsuno et al. | 502/74 |
| 4,761,512 | 8/1988 | Katsuno et al. | 585/417 |
| 4,861,458 | 8/1989 | Martin et al. | 208/73 |
| 5,041,208 | 8/1991 | Patridge et al. | 208/138 |
| 5,073,652 | 12/1991 | Katsuno et al. | 585/419 |
| 5,091,351 | 2/1992 | Murakawa et al. | 502/66 |
| 5,107,061 | 4/1992 | Ou et al. | 585/820 |
| 5,110,854 | 5/1992 | Ratliff | 524/439 |
| 5,128,300 | 7/1992 | Chao et al. | 502/227 |
| 5,196,631 | 3/1993 | Murakawa et al. | 585/419 |
| 5,260,238 | 11/1993 | Murakawa et al. | 502/26 |
| 5,279,998 | 1/1994 | Mulaskey et al. | 502/74 |
| 5,397,652 | 3/1995 | Carey, II et al. | 428/610 |
| 5,401,894 | 3/1995 | Brasier et al. | 585/833 |
| 5,405,525 | 4/1995 | Heyse et al. | 208/133 |
| 5,406,014 | 4/1995 | Heyse et al. | 585/444 |
| 5,413,700 | 5/1995 | Heyse et al. | 208/134 |
| 5,516,421 | 5/1996 | Brown et al. | 208/140 |

FOREIGN PATENT DOCUMENTS

| | | |
|---|---|---|
| 201 856 | 11/1986 | European Pat. Off. . |
| 498182 | 8/1992 | European Pat. Off. . |
| WO 92/15653 | 9/1992 | WIPO . |
| WO 94/15896 | 7/1994 | WIPO . |

OTHER PUBLICATIONS

Audisio, Chemical Vapor Deposition of Tin on Iron or Carburized Iron, pp. 2299–2304, Oct. 1980, J. Electrochem. Soc.: Solid–State Science and Technology.

*Primary Examiner*—Walter D. Griffin
*Attorney, Agent, or Firm*—Witta Priester

[57] ABSTRACT

A catalytic reforming process using a halided zeolite catalyst containing platinum in a metal-coated reactor system where, prior to catalyst loading and reforming, halide acid is removed from the catalyst. The process comprises providing a reforming reactor system having a metal coating; providing a halided zeolite catalyst containing platinum prepared by a method which includes removing volatile halide acid; loading said catalyst into said reactor system; and catalytically reforming hydrocarbons to aromatics, wherein metal from the metal-coated reactor system does not deactivate the catalyst. The coating metal preferably comprises tin and the zeolite catalyst is preferably a platinum L-zeolite catalyst. The invention is also a method for reducing catalyst contamination from a metal which was used to coat a reactor system. The method comprises pretreating a halided catalyst with hydrogen to remove volatile halide acid. The resulting catalyst is then loaded into a metal-coated reactor system and hydrocarbons are converted.

19 Claims, 2 Drawing Sheets

Stannided Coupon

REFORMING PROCESS WITH CATALYST PRETREATMENT

FIELD OF INVENTION

The invention is a method of reforming hydrocarbons wherein the catalyst is pretreated to avoid catalyst deactivation during reforming in metal-coated reactor systems. The invention is especially applicable to low sulfur catalytic reforming processes in stannided reactor systems using halided catalysts, particularly halided platinum L-zeolite. The invention is also a method of reducing catalyst contamination from a metal which was used to coat a reactor system.

BACKGROUND AND RELEVANT REFERENCES

Platinum L-zeolite catalysts for low-sulfur reforming were invented in the early 1980's. After about 10 years of intensive effort, and much research, low sulfur reforming was commercialized in the early 1990's. Progress toward commercialization required many discoveries. Two key discoveries were the criticality of ultra-low sulfur levels in the feed, and the impact of these ultra-low sulfur levels on reactor metallurgy, i.e., the discovery of the need to prevent coking, carburization and metal dusting. A preferred way to prevent coking, carburization and metal dusting utilizes a metal protective layer, especially one comprising tin.

While commercialization of ultra-low sulfur reforming was being pursued, a second generation of sulfur-sensitive platinum L-zeolite catalysts were being developed. These new catalysts are halided, for example, they are treated with freon or with ammonium halide salts. These catalysts allow operations at higher severity, tolerate a wide range of hydrocarbon feeds, have high activity and long life.

Our recent attempts to utilize this second generation of catalysts for ultra-low sulfur reforming resulted in an unexpected and undesired reduction in catalyst activity. After much research and experimentation, it was discovered that these halided catalysts had been partially poisoned by the metal of the metal protective layer, specifically by tin, which had been used to prevent carburization and metal dusting of the reactor system surfaces. Somehow, some of this tin had migrated and deposited on the catalyst. In contrast, when conventional platinum L-zeolite catalysts are used for ultra-low sulfur reforming in a tin-coated reactor system, neither tin migration nor catalyst deactivation due to tin migration are observed. The cause of these problems has now been traced to low levels of volatile hydrogen halides that, under certain conditions, evolve from the catalysts themselves. These hydrogen halides apparently interact with tin-coated surfaces and can deactivate the catalyst.

Therefore, one object of the present invention is to reduce catalyst deactivation by metals derived from a metal-coated reactor system. Another object of the invention is to reduce catalyst contamination from a freshly metal-coated reactor system which would otherwise result in catalyst deactivation. This new process will also improve the reproducibility of catalytic operations, especially platinum L-zeolite reforming operations, since catalyst activity and life can be better predicted.

The use of metal coatings and metal protective layers, especially tin protective layers, in hydrocarbon conversion processes is known. These layers provide improved resistance to coking, carburization and metal dusting, especially under ultra-low sulfur conditions. For example, Heyse et al., in WO 92/1856 coat steel reactor systems to be used for platinum L-zeolite reforming with metal coatings, including tin. See also U.S. Pat. Nos. 5,405,525 and 5,413,700 to Heyse et al. Metal-coated reactor systems are also known for preventing carburization, coking and metal dusting in dehydrogenation and hydrodealkylation processes conducted under low sulfur conditions; see Heyse et al., in U.S. Pat. No. 5,406,014 and WO 94/15896. In the '014 patent, Example 3 shows the interaction of a stannided coupon with hydrocarbons, methyl chloride and hydrogen at 1000 and 1200° F. The coupon was stable to methyl chloride concentrations of 1000 ppm at 1000° F., showing that the tin coating is stable to halogens at reforming temperatures.

The use of catalysts treated with halogen-containing compounds for catalytic reforming is also known. See, for example U.S. Pat. No. 5,091,351 to Murakawa et al. Murakawa prepares a Pt L-zeolite catalyst and then treats it with a halogen-containing compound. The resulting catalyst has a desirably long catalyst life and is useful for preparing aromatic hydrocarbons such as benzene, toluene and xylenes from $C_6$–$C_8$ aliphatic hydrocarbons in high yield. Other patents that disclose halided L-zeolite catalysts include U.S. Pat. Nos. 4,681,865, 4,761,512 and 5,073,652 to Katsuno et al.; U.S. Pat. Nos. 5,196,631 and 5,260,238 to Murakawa et al.; and EP 498,182 (A).

None of these patents or patent applications disclose any problems associated with metal-coated reactor systems. Nor are they concerned with the problems associated with halided catalysts, especially platinum L-zeolite reforming catalysts interacting with metal coatings, such as tin coatings.

They neither teach the desirability nor the need for a catalyst pretreatment step to remove volatile halide acid(s), especially not prior to catalyst loading or prior to hydrocarbon processing. Indeed, the art teaches the advantages of combining one of the preferred coating metals—tin—with a reforming catalyst, specifically with a platinum L-zeolite catalyst. U.S. Pat. No. 5,279,998 to Mulaskey et al., teaches that activity and fouling rate improvements are associated with treating the exterior of the platinum L-zeolite catalyst with metallic tin particles having an average particle size of between 1 and 5 microns (tin dust). For example, Table I of the Mulaskey patent shows improved catalyst performance when metallic tin dust is combined with a platinum L-zeolite catalyst that has been treated with fluoride according to the process of U.S. Pat. No. 4,681,865.

In light of the above teachings, we were surprised to find a decrease in catalyst activity upon reforming in a freshly tin-coated reactor system using a halided platinum L-zeolite catalyst. (See Example below.)

We have now discovered that there are problems associated with using metal-coated reactor systems—especially freshly metal-coated systems—in the presence of halided catalysts, and we have discovered the cause of and solutions for these problems. Thus, one object of the present invention is to reduce catalyst contamination from a freshly metal-coated reactor system. Another object of the invention is to ensure that catalyst contamination is avoided, for example when replacing a conventional catalyst with a halided catalyst.

SUMMARY OF THE INVENTION

In one embodiment, the invention is a catalytic reforming process using a halided platinum L-zeolite catalyst where, prior to catalyst loading and reforming, volatile halide acids are removed from the catalyst. The process comprises: a) providing a reforming reactor system having a metal coating; b) providing a halided Pt L-zeolite catalyst prepared by a method which includes removing volatile halide acid; c) loading said catalyst into said reactor system; and d) catalytically reforming hydrocarbons to aromatics. Preferably most, more preferably substantially all, the volatile halide acid is removed, so that metal from the metal-coated reactor system will not deactivate the catalyst upon reforming.

In a preferred embodiment, the volatile halide acids are removed by contacting the catalyst with a reducing gas at elevated temperatures. Preferably this gas comprises hydrogen, more preferably it comprises a mixture of hydrogen in nitrogen. Preferably the volatile halide acids are removed by a reduction step after catalyst preparation. More preferably, the reduction is done under conditions where the volatile halide acids are fixated, e.g., by caustic scrubbing or by contacting them with disposable or regeneratable solid sorbents. The reduction step should be done under conditions such that the dispersion of the catalytic metal is not significantly decreased.

Preferred metal coatings are those prepared from tin-, germanium-, antimony-, and aluminum-containing compositions. More preferably, the coating metal comprises a tin-containing composition including elemental tin, tin compounds or tin alloys.

In a preferred embodiment, the process of this invention comprises removing volatile halide acid including HCl (and optionally HF) from a halided Pt L-zeolite catalyst by contacting the catalyst with a hydrogen-containing gas, loading the treated halided catalyst into a metal-coated reactor system, and reforming hydrocarbons to aromatics.

In another embodiment, the invention is a method for reducing catalyst contamination from a metal which was used to coat a reactor system. The method comprises contacting a halided catalyst with a hydrogen-containing gas at a temperature above about 300° F. for a time sufficient to remove volatile halide acid. Preferably at least a portion of the volatile halide acid is fixated by contacting it with a scrubbing solution or by sorption onto a solid. The catalyst is then loaded into a metal-coated reactor system and hydrocarbons are converted; the metal of the metal-coated reactor system does not significantly deactivate the catalyst. This method is preferably applied to a freshly metal-coated reactor system, more preferably one having stannided surfaces. A freshly metal-coated reactor system is one that has not been used for hydrocarbon processing since coating, or since coating and curing. Naturally, the conditions for the hydrogen contacting step should be selected to avoid or minimize agglomeration and sintering of the catalytic metal (e.g., platinum).

Among other factors, this invention is based on our observation that halided Pt L-zeolite catalysts are partially deactivated during the start-up phase of a catalytic reforming process, especially when the start-up is done in a freshly tin-coated reactor. This is in contrast to what is observed with conventional Pt L-zeolite catalysts (which are not halided); here catalyst deactivation due to a tin coating has not been noted.

We have found that tin-coated reactor systems, especially those with freshly prepared tin intermetallics, can lose tin from the tin-coated surfaces during the start-up of a reforming process using a halided Pt L-zeolite catalyst. These catalysts, if not pretreated, will evolve halide acids, including HCl. Somehow, interaction of the tin with the volatile halide acids leads to reduced catalyst activity. Thus, we have observed that a freshly tin-coated reactor system, when contacted with halide acids (e.g., HCl and/or HF), will unexpectedly result in mobile tin, which interacts with the platinum catalyst to deactivate it. Based on these discoveries, we have developed simple, inexpensive procedures that quickly and efficiently remove volatile halide acids from the catalyst prior to reforming. When the treated catalyst is loaded into the metal-coated reactor system and hydrocarbon processing begins, the catalyst experiences little or no deactivation from the tin coating.

DETAILED DESCRIPTION OF THE INVENTION

Figure 1:
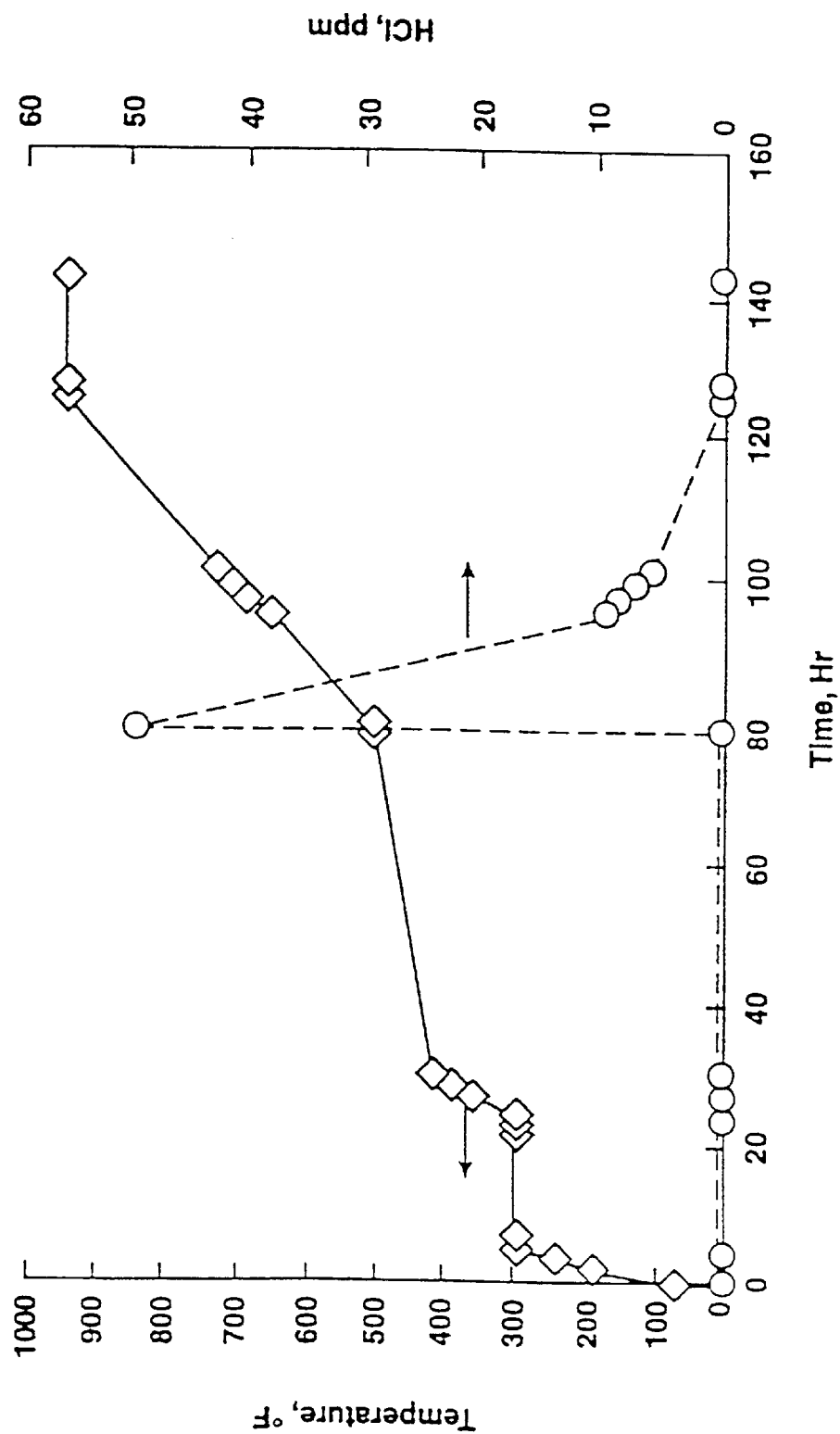
FIG. 1 shows HCl evolution (on right) from a halided reforming catalyst as a function of temperature (on left). Hydrogen was added at 500° F. at 79 hr.

In one broad aspect, the present invention is a process for reforming hydrocarbons in a metal-coated reactor system. The process comprises: a) providing a reforming reactor system having a metal coating; b) providing a halided Pt L-zeolite catalyst prepared by a method which includes removing volatile halide acid; c) loading said catalyst into said reactor system; and catalytically reforming hydrocarbons to aromatics. Preferably most, and more preferably substantially all the volatile halide acid is removed, so that metal from the metal-coated reactor system will not deactivate the catalyst. Conditions for removing the volatile halide acid should be selected to minimize damaging the catalytic metal, for example reducing the Pt dispersion.

In another embodiment, the invention is a method for reducing catalyst contamination from a metal which was used to coat a reactor system. In one especially preferred embodiment, the invention is a method for reducing contamination of a Pt L-zeolite reforming catalyst by tin from a freshly tin-coated reactor system having intermetallic stannides on the surfaces to be contacted with hydrocarbons. The method comprises pretreating a halided catalyst with hydrogen to remove volatile halide acid. The resulting catalyst is then loaded into a metal-coated reactor system and hydrocarbons are converted.

Although the terms "comprises" or "comprising" are used throughout this specification, these terms are intended to encompass both the terms "consisting essentially of", and "consisting of" in various preferred aspects and embodiments of the present invention.

As used herein, the term "reactor system" is intended to include the hot sections of chemical conversion units, especially hydrocarbon conversion units. These units typically comprise one or more conversion reactors and one or more furnaces comprising a plurality of furnace tubes to heat the feed. The term "reactor system" is also intended to include units comprising furnace tube reactors where conversion occurs in furnace tubes (i.e., inside the furnace). The "hot sections" of these units are those sections where the feed is at or above the reaction or process temperature, and/or where the hydrocarbon conversion reactions occur.

As used herein, the term "metal-coated reactor system" is intended to include reactor systems (see above) having a metal-containing cladding, plating, paint or other coating, applied to at least a portion of the surfaces that are to be contacted with hydrocarbons at or above process temperature. Preferably at least half, more preferably at least three quarters, most preferably all of the surface area that is to be contacted with hydrocarbons at or above process temperature is coated and therefore has a metallic layer on the surface. The term "metal-coated reactor system" is also intended to include reactor systems having protective layers, such as intermetallic layers that are prepared from claddings, platings, paints or coatings. Depending on the metal, a reactor system having a coating applied thereto may be cured by heating, preferably in a reducing environment, to produce intermetallic layers. In this instance, the metal-coated reactor system preferably comprises a base construction material (such as a carbon steel, a chromium steel, or a stainless steel) having one or more adherent metallic layers attached thereto. Examples of metallic layers include elemental chromium, aluminized surfaces and iron-tin intermetallic compounds such as $FeSn_2$. Freshly metal-coated reactor systems, for example ones that have been freshly-stannided, are those which has not been used for hydrocarbon processing since coating, or since coating and curing.

As used herein, the term "metal-containing coating" or "coating" is intended to include claddings, platings, paints and other coatings which contain either elemental metals, metal oxides, organometallic compounds, metal alloys, mixtures of these components and the like. The metal(s) or metal compounds are preferably a key component(s) of the coating. Flowable paints that can be sprayed or brushed are a preferred type of coating.

Although discussed hereinafter in terms of providing tin-intermetallic layers or tin coatings, it is believed that germanium-, arsenic- and antimony-intermetallic layers, especially freshly prepared layers also comprise reactive metal, and that our discoveries are also applicable to these metals. The discussion herein of tin coating or tin-intermetallic layers is merely intended to exemplify a preferred embodiment, and is not intended to limit the invention to tin coatings or tin intermetallics.

REMOVING VOLATILE HALIDE ACIDS

The term, "volatile halide acid" is intended to encompass halide acids including HCl, HF, HBr, HI, as well as mixtures comprising these gases. It is also intended to include the gases evolved from a halided catalyst, such as a halided platinum L-zeolite catalyst, when heated in the presence of hydrogen, preferably also in the presence of platinum. The volatile halide acid may also contain $NH_3$. The volatile halide acids are those that are gaseous or can be removed from a catalyst at process conditions, i.e., under use conditions for the catalyst.

The volatile halide acids are preferably removed by a process which includes reduction after catalyst preparation. Preferably the reduction is done under conditions where the volatile halide acids are fixated, e.g., by caustic scrubbing, or by trapping on a disposable sorbent. Removing the volatile halide acids prevents later attack (of these acids) on the coating of a metal-coated hydrocarbon conversion reactor, and thus prevents catalyst deactivation.

The volatile halide acids may be removed from the halided catalyst in a variety of ways, preferably after the drying/calcination stages of catalyst preparation. During calcination (heat treating with oxygen) the platinum complex is decomposed. Then, the halide content of the catalyst is decreased by reduction treatment. This reduction may be done at temperatures below the calcination temperature, but preferably it is done at temperatures above about 500° F.

The reduction may be done in various types of equipment, such as vacuum equipment, moving belt heat treaters, rotary kilns with controlled atmospheres, fixed bed heat treaters and the like. During the reduction, care must be taken to ensure that the halided catalyst is not contaminated, for example by sulfur or corrosion by-products produced through reaction of halide acid gases with the catalyst or with the metallurgy of the process equipment.

In a preferred embodiment, the volatile halide acids are removed by contacting the catalyst with a reducing gas at elevated temperatures. Preferred reducing gases include CO; hydrogen, mixtures of hydrogen with inert gases or with CO, more preferably the reducing gas is a mixture of hydrogen in nitrogen. The reductive gas may be used once-through, or preferably, it is recycled, In this way the size of the gas scrubber(s), dryer(s) and sorber systems which remove impurities and clean up the gas before use or re-use are minimized, and gas costs are reduced.

When hydrogen is used, its concentration may vary from dilute to pure hydrogen. The preferred concentration depends on the type of equipment used, the time needed to remove the volatile halide acid, and safety considerations. When a mixture of hydrogen and nitrogen is used, the ratio of hydrogen to nitrogen is believed not to be critical. However, it is preferred that the ratio be between 1:100 and 1:1; more preferably between 1:40 and 1:2, and most preferably between 1:20 and 1:5. For extremely sulfur-sensitive catalysts, the reducing gas is preferably sulfur-free, i.e. it has less than 50 ppb sulfur, preferably less than 5 ppb sulfur. In a preferred embodiment, sulfur-free nitrogen and sulfur-free hydrogen (e.g., a 10% mixture of hydrogen in nitrogen) are used to remove the volatile halide acid. The water content of the reducing gas is preferably less than 100 ppm.

Useful reduction conditions include temperatures above about 300° F., preferably between 300 and 1200° F., more preferably between about 500 and 1000° F., and gas flow rates of between 100 and 10,000 GHSV, more preferably between 500 and 5000 GHSV. The pressure is not critical and may be between vacuum and 350 psi; preferably it is between atmospheric pressure and 200 psi. Generally, the pressure depends on the equipment used. For example, for a separate pressurizable vessel, one may operate between 50 and 150 psi; for a moving belt treater, one may prefer to operate at atmospheric pressure, for a vacuum vessel, one may prefer subatmospheric pressure.

Reduction conditions are selected to avoid catalyst damage, especially metal (Pt) sintering and agglomeration. Agglomeration of the platinum causes loss of catalyst activity and life. Thus conditions should be selected to minimize loss of Pt dispersion, e.g., gas flow rates should be high and catalyst heat-up rates should be about 10° F./hr or higher. The water concentration in the treating gas should be below about 1 wt %, preferably below about 0.1 wt %, and more preferably less than 100 ppm. The platinum dispersion of the catalyst after halide acid removal should be substantially the same as or better than the platinum dispersion before halide acid removal. Metal dispersion can be monitored by hydrogen chemisorption or CO chemisorption, or other methods well known to those skilled in the art.

One preferred way to remove volatile halide acids is to use steps similar to those used during reforming catalyst start-ups. Conditions for this type of start-up are well known to those skilled in the art. For example, the start-up may include drying the catalyst in $N_2$ (e.g., by heating from room temperature to 500° F. for 80 hr) and then heating the catalyst in hydrogen (e.g., in a mixture of 10% $H_2$ in $N_2$ from 500 to 932° F. at a rate of 10° F./hr over a period of about 40 hr, and then maintaining the catalyst at about 932° F. for 24 hr). Gas hourly flow rates are selected to rapidly remove the volatile halide acids, e.g., the GHSV may be maintained at about 1300 hr$^{-1}$ for the drying and reduction periods. Thereafter, the catalyst is cooled to room temperature. In a preferred embodiment, the catalyst is then stored under nitrogen and kept free of oxygen and water until use. However this is not critical, since the catalyst can be dried and re-reduced during start-up of the reforming process, should it become oxidized or adsorb water.

As will be appreciated by those skilled in the art, the concentrations of $NH_3$ and $H_2O$ during reduction should be below levels which damage the halided L-zeolite catalyst or reduce the platinum dispersion. As indicated above, limiting the reduction temperature, using high flow rates and pre-drying the catalyst all help ensure that high metal dispersions are maintained.

Since the reduction method may be done in various types of equipment, such as vacuum equipment, moving belt heat treaters, rotary kilns with controlled atmospheres, fixed bed heat treaters and the like, there are a variety of ways of introducing the reductive gas and heating the halided catalyst. For example, one may use a hot, flowing gas stream comprising purified combustion gases, or indirectly fired gases. If equipment is available that can operate at elevated pressure, the heat treatment can be done in flowing hydrogen in a separate reactor vessel, for example in a hydrotreating reactor. The individual process details for the reduction step are not critical, so long as a reductive (preferably a hydrogen-containing) atmosphere is used, and the volatile halide acids are removed. Primary concerns while carrying out this removal are (a) to remove the volatile halide acid on the halided catalyst; (b) to maintain maximum dispersion of the catalytic metal; (c) to not contaminate the catalyst; and (d) to treat the catalyst in a safe manner, e.g. avoiding potential explosions, fires and the like.

While not wishing to be bound by theory, it is believed that the halide acid evolved from the halided catalysts, particularly during normal catalyst startup, can attack the protective coating of a metal-coated reactor system. Volatile HCl is evolved from the catalyst rapidly at the beginning of a reforming run. It has been found that chlorides impregnated into a Pt L-zeolite reformer catalyst at a level of 0.7 wt %, will rapidly evolve volatile chloride acid during reforming operation. After about 200 to 300 hours, the chloride rate loss is substantially reduced. After this initial period, about half of the originally added chlorides remained on the catalyst. The loss of chlorides during this initial period can cause significant metal losses from protective coating on reactors and furnace tubes.

For catalysts prepared using ammonium salts, we have found that about 50% of the added chloride and about 10% of the added fluoride are readily removed by the methods described above. Thus, this is a useful target for halide removal. Additionally, residual nitrogen in the form of ammonia may also evolve during the halide acid removal step, especially when the halided catalyst is prepared by impregnation using $NH_4Cl$ and $NH_4F$ as the halide sources.

It is preferred to trap or otherwise fixate the volatile halide acids. These gases are poisonous and dangerous. For example, effluent HCl and HF can be fixated using a solid or liquid material (an adsorbent or absorbent) which will trap these halide acid. Suitable liquid sorbents include water, preferably caustic (NaOH), or other basic scrubbing solutions or disposable solid sorbents. The location of the sorbent is not critical, although it is preferred to fixate the volatile halide acids as soon as possible, so they do not cause corrosion. The amount of fixating agent is not critical, although it is preferred that there is a sufficient amount to fixate the evolved halide acids.

PLATINGS, CLADDINGS, PAINTS AND OTHER COATINGS

The invention does not apply to all metal-coated reactor systems. Many metal-containing platings, claddings, paints and coatings do not interact with volatile halide acids to deactivate the catalyst under conversion/process conditions. However, simple tests such as those described in the examples will readily identify metals and coatings that require the catalyst pretreatment process of this invention.

Metal coatings are typically applied to reactor systems to improve process operability. The reactor systems of this useful in this invention have generally had metallic protective layers applied in order to reduced coking, carburization and/or metal dusting.

The metal used in the coating depends on the requirements of the hydrocarbon conversion process of interest, for example, its temperatures, reactants, etc. Coating metals that melt below or at process conditions and form intermetallic complexes with the substrate material are especially preferred. They are able to more readily provide complete substrate coverage. These metals include those selected from among tin, antimony, germanium, arsenic, bismuth, aluminum, gallium, indium, copper, and mixtures, intermetallic compounds and alloys thereof Preferred metal-containing coatings comprise metals selected from the group consisting of tin, antimony, germanium, arsenic, bismuth, aluminum, and mixtures, intermetallic compounds and alloys of these metals. Especially preferred coatings include tin-, antimony-and germanium-containing coatings. These metals will form continuous and adherent protective layers. Tin coatings are especially preferred—they are easy to apply to steel, are inexpensive and are environmentally benign. The most preferred metals interact with, or more preferably react with, the base material of the reactor system to produce a continuous and adherent metallic protective layer at temperatures below or at the intended hydrocarbon conversion conditions.

It is preferred that the coatings be sufficiently thick that they completely cover the base metallurgy, and that after removal of the movable metal, the resulting protective layer remain intact, so it can protect the steel for years of operation. At the same time, thin layers are desirable. Thin layers can be produced readily, are less costly than thicker layers, and are less likely to fracture under thermal stress. Thus, the optimum thickness of the protective layer depends on the intended use conditions and the specific coating metal. For example, tin paints may be applied to a (wet) thickness of between 1 to 6 mils, preferably between about 2 to 4 mils. In general, the thickness after curing is preferably between about 0.1 to 50 mils, more preferably between about 0.5 to 10 mils, most preferably about 1 mil. Also, it is desirable that the coating and any produced intermetallic layers at least initially be firmly bonded to the steel; this can be accomplished, for example, by curing at elevated temperatures. For example an applied tin paint can be cured in hydrogen at 1100° F. for 24 hours.

Metal-containing coatings can be applied in a variety of ways, which are well known in the art. These include electroplating, chemical vapor deposition, and sputtering, to name just a few. Preferred methods of applying coatings include painting and plating. Where practical, it is preferred that the coating be applied in a paint-like formulation (hereinafter "paint"). Such a paint can be sprayed, brushed, pigged, etc. on reactor system surfaces.

Tin is a preferred coating metal and is exemplified herein; disclosures herein about tin are generally applicable to other metals such as germanium. Preferred paints comprise a metal component selected from the group consisting of: a hydrogen decomposable metal compound such as an organometallic compound; a finely divided metal; and a metal oxide, preferably a metal oxide that can be reduced at process or furnace tube temperatures. In a preferred embodiment a cure step is used to produce a intermetallic protective layer bonded to the steel through an intermediate bonding layer, for example a carbide-rich bonding layer. This is described in U.S. Pat. No. 5,406,014 to Heyse et al., which is incorporated herein by reference in its entirety.

Some preferred coatings and paint formulations are described in U. S. Ser. No. 803,063 to Heyse et al., corresponding to WO 92/15653, which is also incorporated herein by reference in its entirety. One especially preferred tin paint contains at least four components or their functional equivalents: (i) a hydrogen decomposable tin compound, (ii) a solvent system, such as isopropanol, (iii) finely divided tin metal and (iv) tin oxide. As the hydrogen decomposable tin compound, organometallic compounds such as tin octanoate or neodecanoate are particularly useful. Component (iv), the tin oxide is a porous tin-containing compound which can sponge-up the organometallic tin compound, and can be reduced to metallic tin. The paints preferably contain finely divided solids to minimize settling. Finely divided tin metal, component (iii) above, is also added to insure that metallic tin is available to react with the surface to be coated at as low a temperature as possible. The particle size of the tin is preferably small, for example one to five microns. When tin paints are applied at appropriate thicknesses, heating under reducing conditions will result in tin migrating to cover small regions (e.g., welds) which were not painted. This will completely coat the base metal.

Some coating compositions need to be cured by heat treatment to produce continuous and adherent protective layers. Cure conditions depend on the particular metal coating as well as the hydrocarbon conversion process to which the invention is applied. For example, gas flow rates and contacting tine depend on the process configuration, the coating metal the components of the coating composition, and the cure temperature. Cure conditions are selected to result in a continuous and uninterrupted protective layer which adheres to the steel substrate. Cure conditions may be readily determined. For example, coated coupons may be heated in the presence of hydrogen in a simple test apparatus; the formation of a continuous protective layer may be determined using petrographic analysis.

As discussed above, it is preferred to contact the metal-coated reactor system with the getter after the curing step, especially when intermetallics are formed during beat treatment. Tin paints are preferably cured between 900° F. and 100° F.; germanium and antimony paints are preferably cured between 1000° F. and 1400° F. Curing is preferably done over a period of hours, often with temperatures increasing over time when the paint contains reducible oxides and/or oxygen-containing organometallic compounds. Reduction/curing is preferably done using a gas containing hydrogen, more preferably in the absence of hydrocarbons.

As an example of a suitable paint cure for a tin paint, the system including painted portions can be pressurized with flowing nitrogen, followed by the addition of a hydrogen-containing stream. The reactor inlet temperature can be raised to 800° F. at a rate of 50–100° F./hr. Thereafter, the temperature can be raised to 950–975° F. at a rate of 50° F./hr, and held for about 48 hours.

In a preferred embodiment the metal-coated reactor system comprises an intermetallic layer. This layer (which covers a base construction material such as a steel substrate) contains two or more metals, the metals being present in a stoichiometric ratio, i.e., as intermetallic compounds. Intermetallic compounds are well known in the art; they are more structured than molecular mixtures or alloys. Moreover, they have physical properties (such as color) and chemical properties that are unique to the intermetallic phase.

For example, an intermetallic stannide layer contains tin intermetallic compounds comprising tin and at least one other metal, the tin and the other metal(s) being present in compounds which have a stoichiometric ratio of elements that vary only within a narrow range. Examples of these tin intermetallic compounds are $Fe_3Sn$, $FeSn_2$, $FeSn$, $Ni_3Sn_2$, $Ni_3Sn$, $Ni_3Sn_4$. Other examples include mixed metal intermetallic stannides, for example $(Fe,Ni)_xSn_y$ where Fe and Ni substitute freely for one another, but summed together are present in a stoichiometric ratio with the tin.

While not wishing to be bound by theory, it is believed that, especially in a freshly metal-coated reactor system comprising surface intermetallics, there will be some metal that has not reacted with the base construction material. This unreacted coating metal is believed to be, at least in part, the cause of catalyst poisoning during exposure to volatile halide acids.

Metal-coated reactor systems are especially useful in processes operated under low sulfur conditions, since the coating provides improved resistance to coking, carburization and metal dusting. Thus, in an especially preferred embodiment of the invention, the hydrocarbon conversion process is conducted under conditions of "low sulfur". In these low-sulfur systems, the feed will preferably contain less than 50 ppm sulfur, more preferably, less than 20 ppm sulfur and most preferably less than 10 ppm sulfur. In another preferred embodiment, the invention is conducted under conditions of "ultra-low sulfur". Here sulfur levels are preferably below 100 ppb, more preferably below 50 ppb, and most preferably below 20 ppb S, with sulfur levels below 10 ppb and especially below 5 ppb being particularly preferred.

THE BASE CONSTRUCTION MATERIAL

There are a wide variety of base construction materials which may be used in the process of this invention. In particular, a wide range of steels and alloys may be used in the reactor system. In general, steels are chosen so they meet minimum strength and flexibility requirements needed for the intended hydrocarbon conversion process. These requirements in turn depend on process conditions, such as operating temperatures and pressures. Additionally, the steel is chosen so it is not susceptible to expected corrosion hazards.

Useful steels include carbon steel; low alloy steels such as 1.25, 2.25, 5, 7, and 9 chrome steel with or without molybdenum; 300 series stainless steels including type 304, 316 and 347 stainless steel; heat resistant steels including HK-40, HP-50 and manurite, as well as treated steels, such as aluminized or chromized steels.

CATALYTIC REFORMING

The present invention is especially applicable to catalytic reforming and/or dehydrocyclization processes, such as those described in U.S. Pat. No. 4,456,527 to Buss et al. and WO92/1856 to Heyse et al.

One preferred embodiment of the invention involves catalytic reforming using a halided medium-pore size or large-pore size zeolite catalyst including an alkali or alkaline earth metal and charged with one or more Group VIII metals. Especially preferred is the embodiment where such a catalyst is used in reforming or dehydrocyclization of a paraffinic naphtha feed containing $C_6$, and/or $C_8$ hydrocarbons to produce aromatics, for example a $C_6$ to $C_8$ UDEX raffinate. The invention is especially applicable to ultra-low sulfur reforming using an intermediate or large pore zeolite catalyst containing added halogens, especially a halided platinum on non-acidic L-zeolite catalyst.

By "intermediate pore size" zeolite is meant a zeolite having an effective pore aperture in the range of about 5 to 6.5 Angstroms when the zeolite is in the H-form. These zeolites allow hydrocarbons having some branching into the zeolitic void spaces and can differentiate between n-alkanes and slightly branched alkanes compared to larger branched alkanes having, for example, quaternary carbon atoms. Useful intermediate pore size zeolites include ZSM-5 described in U.S. Pat. Nos. 3,702,886 and 3,770,614; ZSM-11 described in U.S. Pat. No. 3,709,979; ZSM-12 described in U.S. Pat. No. 3,832,449; ZSM-21 described in U.S. Pat. No. 4,061,724, and silicalite described in U.S. Pat. No. 4,061,724. Preferred zeolites are silicalite, ZSM-5, and ZSM-11. A preferred Pt on zeolite catalyst is described in U.S. Pat. No. 4,347,394 to Detz et al.

By "large-pore size zeolite" is meant a zeolite having an effective pore aperture of about 6 to 15 Angstroms. Preferred large pore zeolites which are useful in the present invention include type L-zeolite, zeolite X, zeolite Y and faujasite. Zeolite Y is described in U.S. Pat. No. 3,130,007 and Zeolite X is described in U.S. Pat. No. 2,882,244. Especially preferred zeolites have effective pore apertures between 7 to 9 Angstroms. In a preferred embodiment, the invention uses a medium-pore size or large-pore size zeolite catalyst containing an alkali or alkaline earth metal and charged with one or more Group VIII metals.

The zeolitic catalysts used in the invention are charged with one or more Group VIII metals, e.g., nickel, ruthenium, rhodium, palladium, iridium or platinum. Preferred Group VIII metals are iridium and particularly platinum. If used, the preferred weight percent platinum in the catalyst is between 0.1% and 5%. Group VIII metals can be introduced into zeolites by synthesis, impregnation or exchange in an aqueous solution of appropriate salt. When it is desired to introduce two Group VIII metals into the zeolite, the operation may be carried out simultaneously or sequentially.

Especially preferred catalysts for use in this invention are Group VIII metals on large pore zeolites, such as L-zeolite catalysts containing Pt, preferably Pt on non-acidic L-zeolite. Halided Pt L-zeolite catalysts are particularly preferred. The composition of type L-zeolite expressed in terms of mole ratios of oxides, may be represented by the following formula:

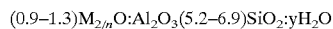

$(0.9-1.3)M_{2/n}O:Al_2O_3(5.2-6.9)SiO_2:yH_2O$

In the above formula M represents a cation, n represents the valence of M, and y may be any value from 0 to about 9. Zeolite L, its x-ray diffraction pattern, its properties, and methods of preparation are described in detail in, for example, U.S. Pat. No. 3,216,789, the contents of which is hereby incorporated by reference. The actual formula may vary without changing the crystalline structure. Useful Pt on L-zeolite catalysts also include those described in U.S. Pat. No. 4,634,518 to Buss and Hughes, in U.S. Pat. No. 5,196,631 to Murakawa et al., in U.S. Pat. No. 4,593,133 to Wortel and in U.S. Pat. No. 4,648,960 to Poeppelmeir et al., all of which are incorporated herein by reference in their entirety. Preferably, the catalyst be substantially free of acidity.

In one preferred embodiment, the invention is a catalytic reforming method which uses a halided zeolite catalyst containing platinum. Prior to loading the catalyst into a metal-coated reactor system, volatile halide acid is removed from the catalyst. The catalyst is then loaded and hydrocarbons are reformed. The process comprises:

a) providing a metal-coated reforming reactor system;
b) providing a halided zeolite catalyst containing platinum which has been pretreated with hydrogen to remove volatile halide acids comprising HCl;
c) loading the treated halided zeolite catalyst into the reactor system; and
d) reforming hydrocarbons to aromatics.

Preferably the metal-coated reforming reactor system has stannided surfaces. Preferably the pre-treatment process also removes volatile HF. And preferably the HCl is fixated by contacting it with a scrubbing solution or by sorption onto a solid.

In an especially preferred embodiment, the catalytic reforming process uses a Pt L-zeolite catalyst and comprises:

a) coating a reforming reactor system with a tin-containing paint and contacting the painted reactor system with a hydrogen-containing gas at 800–1150° F. to produce stannides;
b) providing a halided Pt L-zeolite catalyst prepared by a process which comprises impregnating the catalyst with $NH_4Cl$ and $NH_4F$ and treating the halided catalyst with hydrogen to remove volatile halide acid;
c) loading the treated halided Pt L-zeolite catalyst into the reactor system; and
d) reforming hydrocarbons to aromatics under ultra-low sulfur reforming conditions of less than 10 ppb sulfur.

Preferably, substantially all the volatile halide acid is removed in step (b).

Thus one preferred embodiment of the invention uses catalysts treated with halogen-containing compounds, referred to herein as halided catalysts. These special types of catalysts have recently been disclosed. For example, U.S. Pat. No. 5,091,351 to Murakawa et al., discloses preparing a Pt L catalyst, and then treating it with a halogen-containing compound. Other related patents that disclose halided zeolite catalysts include EP 498,182 A which discloses co-impregnation with $NH_4Cl$ and $NH_4F$; U.S. Pat. Nos. 4,681,865, 4,761,512 and 5,073,652 to Katsuno et al.; U.S. Pat. Nos. 5,196,631 and 5,260,238 to Murakawa et al. Halided catalysts also include spent catalysts, particularly spent previously-halided catalysts, which have been rejuvenated by adding halogen-containing compounds (see, e.g., U.S. Pat. No. 5,260,238). Here a spent catalyst is first decoked in a reductive or oxidative atmosphere. Then it is halided by impregnation with aqueous ammonium chloride and fluoride solution, followed by calcination. These patents are all incorporated herein by reference. The halided catalysts described in these patents have been treated with halogen-containing compounds, generally with chlorine-containing and/or fluorine-containing compounds. Preferably, the catalysts have been treated with both chlorine and fluorine-containing compounds or with one or more compounds containing both chlorine and fluorine. These halided catalysts have a desirably long catalyst life and activity. They are especially useful for preparing aromatic hydrocarbons such as benzene, toluene and xylenes from $C_6$–$C_8$ aliphatic hydrocarbons.

We have observed that these halided catalysts evolve small amounts of HCl and/or HF when these special types of catalysts are heated at elevated temperatures (e.g., at process conditions), or when contacted with hydrogen at temperatures above about 300–400° F. And, this produced halide acid gas reacts with reactive metal present in metal-coated reactor systems. Hence the need for the present invention. It should be noted that the above-described treatment with halogen-containing compounds differs from that typically associated with platinum loading, e.g., by impregnation or ion exchange with compounds comprising platinum and halogen. This treatment also differs from that associated with wash solutions used before, during or after impregnation or ion exchange of conventional catalysts, where small amounts of halides may be added.

In some applications, for example in ultra-low sulfur reforming using a non-acidic Pt L-zeolite catalysts, it is preferred that the feed to the catalyst be substantially free of sulfur, i.e. sulfur levels be maintained at below 50 ppb, preferably below 10 ppb and more preferably below 5 ppb.

Preferred reforming process conditions include a temperature between 700 and 1050° F., more preferably between 800 and 1025° F., and a pressure between 0 and 400 psig, more preferably between 15 and 150 psig; a recycle hydrogen rate sufficient to yield a hydrogen to hydrocarbon mole ratio for the feed to the reforming reaction zone between 0.1 and 20, more preferably between 0.5 and 10; and a liquid hourly space velocity for the hydrocarbon feed over the reforming catalyst of between 0.1 and 10, more preferably between 0.5 and 5.

To achieve the suitable reformer temperatures, it is often necessary to heat the furnace tubes to higher temperatures. These temperatures can often range from 800 to 1250° F., usually from 850 and 1200° F., and more often from 900 and 1150° F.

To obtain a more complete understanding of the present invention, the following examples illustrating certain aspects of the invention are set forth. It should be understood, however, that the invention is not intended to be limited in any way to the specific details of the examples.

EXAMPLE 1

Preparing a Halided Platinum L-zeolite Catalyst
(Comparative)

A halided platinum L-zeolite catalyst was prepared in a manner similar to EP 498,182A1, Example 4. To 100 parts by weight of L-type zeolite, 20 parts by weight of a silica binder were added with mixing and kneaded and molded. Then the molded mixture thus obtained was air-calcined at 500° C. (932° F.) for 2 hours and a molded L-zeolite with a silica binder was obtained. An impregnation liquid comprising 0.097 g of ammonium fluoride, 0.075 g of ammonium chloride, 0.171 g of platinum tetrammine chloride and 4.8 g of ion exchange water was prepared. This liquid was slowly dropped in 10 g of the molded L-type zeolite with stirring. The resulting zeolite was dried at room temperature overnight, then treated at 300° C. (572° F.) or 3 hours in the air. The calcination temperature and time should not be exceeded in order to limit platinum agglomeration. The calcined catalyst contained about 0.7 wt % F and 0.7 wt % Cl. Similar catalysts were prepared at slightly higher halide levels.

Such a halided Pt L-zeolite catalyst was loaded into a freshly tin-coated pilot plant. Then this catalyst was subjected to a start-up treatment. This startup included drying the catalyst in $N_2$ from room temperature to 500° F. for 79 hr; then heating the catalyst in a mixture of 10% $H_2$ in $N_2$ from 500 to 932° F. at a rate of 10° F./hr over a period of about 43 hr, and then maintaining the catalyst at about 932° F. for 24 hr. The gas hourly space velocity (GHSV) was maintained at 1300 $hr^{-1}$, once-through, for the drying and reduction periods. Thereafter, the entire reactor was cooled to room temperature.

During the course of this experiment it was observed that the catalyst started to evolve HCl and HF when heated to 500° F. and above and hydrogen was introduced. FIG. 1 shows HCl evolution as a function of temperature. HF loss was also observed. Gastec tubes were used to measure HCl concentration. Hydrogen was added at time=79 hr. Halide levels on the catalyst were measured, about 50% of the originally added chloride (from the ammonium chloride) and about 15% of the originally added fluoride (from the ammonium fluoride) were evolved.

Additionally this catalyst was used for catalytic reforming. (See Example 3 below). Catalyst inactivation was observed compared to an identical catalyst in a non-stannided reactor. This inactivation, was eventually traced to tin migrating to the catalyst. It is believed that during the start-up treatment, the evolved halide acids reacted with the freshly tin-coated surface, producing mobile tin which deactivated the catalyst.

EXAMPLE 2

Preparing a Pt L-zeolite Catalyst by Pre-calcination
(Comparative)

A Pt L-zeolite catalyst was prepared in two stages. It was anticipated that the pre-calcination step prior to platinum loading would lead to lower levels of volatile halide acid. In a first step, an L-zeolite catalyst base was impregnated with about 0.9 wt % fluoride and 0.55 wt % chloride, both as the ammonium salts. The resulting halided base was then calcined in air at 950° F. for 2 hr. This calcined catalyst base was then impregnated with Pt as in Example 1, and then calcined at 570° F. for 1 hr. The final halide levels on the catalyst were measured. Substantially no loss of chloride or fluoride had occurred, as compared to a similar catalyst prepared without calcination prior to Pt loading. Apparently, the calcination treatment was not effective in removing the volatile halide acids.

EXAMPLE 3

Reforming Screening Tests

Figure 2A:
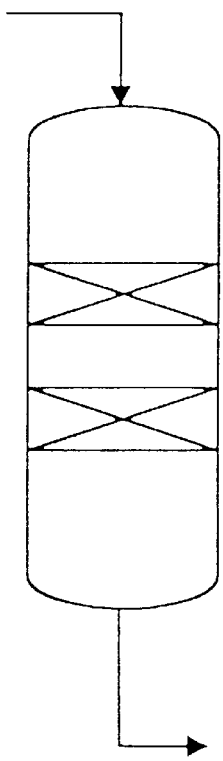
FIG. 2A shows an experimental configuration used for a screening test described in Example 3.

The impact of a tin coating on catalyst performance was assessed in pilot plant tests. Run 1 (144–181) was done in a type 316 stainless steel reactor that was not stannided. The gases were not recycled and the evolved halide acids were vented. One hundred and thirty cc of catalyst, prepared per Example 1, was loaded upstream of another catalyst layer of 60 cc. The set up shown in FIG. 2A was used. The catalyst served as an HCl/HF source. A startup treatment of the catalyst was done. This startup included drying the catalyst in $N_2$ from room temperature to 500° F. for 79 hr; then heating the catalyst in a mixture of 10% $H_2$ in $N_2$ from 500 to 932° F. at a rate of 10° F./hr over a period of about 43 hr, and then maintaining the catalyst at about 932° F. for 24 hr. GHSV was maintained at 1300 $hr^{-1}$ for the drying and reduction periods. Thereafter, the entire reactor was cooled to room temperature.

The upper catalyst layer was removed under a nitrogen blanket. A catalyst performance test was done using the lower catalyst only. Test conditions were 100 psig, 1.6 LHSV, 3.0 H$_2$/hydrocarbon and a target yield of 46.5 wt % aromatics. The feed was a C$_6$–C$_8$ UDEX raffinate from an aromatics extraction unit.

Figure 2B:
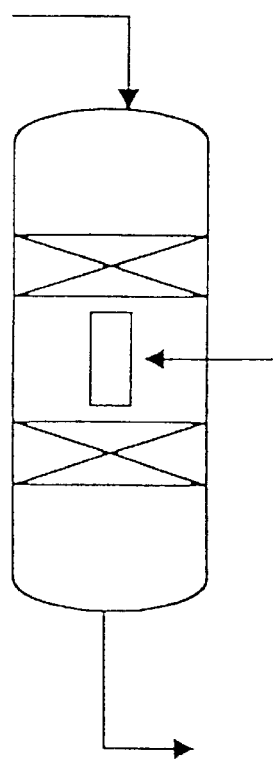
FIG. 2B shows an experimental configuration used for a screening test also described in Example 3.

Run 2 (144–182) was set up as shown in FIG. 2B. Here, a freshly-stannided reactor and freshly-stannided type 347 stainless steel coupons were used. Because of the process configuration, the ratio of stannided surface area to total catalyst volume was equal to about 20 times that of commercial scale equipment. Eighty cc of catalyst prepared per Example 1 was loaded upstream of a freshly stannided coupon. Another catalyst layer of 80 cc was loaded downstream of the stannided coupons. Then the startup procedure of Run 1 was done. After cooling, the upper catalyst layer and the coupon were removed under a nitrogen blanket. A catalyst performance test (as in Run 1) was done using the lower catalyst only. After the performance test, the lower catalyst layer was analyzed and found to contain about 1,000 ppm tin.

After 1200 hours on stream, start-of-run (SOR) temperatures were determined for Runs 1 and 2 by extrapolating the line-out temperature needed to achieve the target aromatic yield back to time=0. SOR temperatures showed that the catalyst of Run 2 was about 10° F. less active than the catalyst of Run 1. It is believed that reactive tin had reacted with evolving halides, including HCl, from the first catalyst layer, producing movable tin. This movable tin had deactivated the catalyst in the second catalyst layer.

EXAMPLE 4

Preparing a Pt L-zeolite Catalyst Useful in This Invention

The impact of removing volatile halide acid before catalyst loading was assessed in a pilot plant test. A catalyst was prepared using the procedure of Example 1; it was dried in nitrogen at 1,300 GHSV. It was then placed in a stannide-free pilot plant and heated from room temperature to 500° F. at this flow rate. Then hydrogen was introduced and the rate of nitrogen decreased, keeping the total flow rate constant. The rate of hydrogen was maintained at 10% of the total flow. The catalyst was activated by treatment with this hydrogen in nitrogen stream (H$_2$/N$_2$=1/9) while the catalyst was heated at a rate of 10° F./hr from 500° F. to 932° F. over a period of about 40 hours. Afterwards, the catalyst was maintained at about 932° F. for 24 hr in the absence of feed. HCl evolution was monitored using Gastec tubes. About 50% of the chloride added to the catalyst had evolved after this procedure.

The catalyst was then allowed to cool to room temperature in nitrogen and is loaded into a freshly stannided reactor system. After catalyst startup, catalyst inactivation by the tin is not observed. The catalyst activity is about the same as for a catalyst undergoing reforming in an uncoated pilot plant.

EXAMPLE 5

Removing Volatile Halide Acid from a Rejuvenated Catalyst

A spent catalyst originally prepared in a manner similar to that described in Example 1 was deactivated by prolonged use in an ultra-low sulfur reforming process. The resulting catalyst had lost most of the originally added fluoride and chloride. This catalyst is oxidized with 2% oxygen in nitrogen at atmospheric pressure and heated for one hour each at 300, 400 and 500° C. It is then cooled to room temperature and the halide content measured.

Two grams of this catalyst is rejuvenated by impregnating it with a mixed solution of 0.284 g of 3.6 wt % aqueous ammonium chloride solution, 0.0195 g of solid ammonium fluoride and 0.8 g of de-ionized water. The impregnated catalyst is dried at room temperature overnight and then is calcined in air at 120° C. and 400° C., each for 3 hours. This restores the catalyst to its original fluoride and chloride levels of about 1% each. The procedure of Example 4 is then followed to evolve the volatile halide acids. The treated catalyst is used for catalytic reforming in a stannided reforming reactor. Catalyst deactivation by the tin of the reactor coating is not observed.

EXAMPLE 6

Preparing Catalysts Useful in the Invention

Example 6A—A catalyst is prepared by pre-treating a halided Pt L-zeolite catalyst with hydrogen to remove halide acids. The pre-treatment is done in a reactor vessel that was not metal-coated. A dried and calcined catalyst is prepared in a manner similar to that of Example 1. It is then heated in N$_2$ at a GHSV of 1300 h$^{-1}$ and a pressure of 70 psig. The temperature is raised to 500° F. over 6 hours and then is held at 500° F. for five hours. A 9:1 N$_2$/H$_2$ mixture is introduced and then the reactor is heated to 932° F. at a rate of 10° F./hr and then it is held at 932° F. for 24 hours. The catalyst is cooled in nitrogen and stored. The volatile halide acids are adsorbed on contact with a solid bed of halogen sorbent. This procedure allows the volatile halide acids to be removed from the catalyst prior to loading the catalyst into the tin-coated reactor and prior to process startup. Having removed the volatile halide acids, they do not interact with the tin coating of the reactors and downstream hardware, so catalyst contamination is minimized.

Example 6B—A catalyst is prepared by pre-treating a halided Pt L-zeolite catalyst with hydrogen to remove halide acids. The pre-treatment is done in a controlled atmosphere, moving bed apparatus. In the first zone, a dried and calcined catalyst prepared in a manner similar to that of Example 1 is heated from room temperature to 500° F. with indirectly fired nitrogen passing through the catalyst bed. The residence time is about 2 hours. A second zone is maintained at 500° F. for about 1 hour, and then the atmosphere is switched to a preheated H2/N2 mixture (2 vol. % hydrogen). In a third zone, the temperature is raised to about 800° F. for about 1 hr. In the fourth and final zone, the catalyst is rapidly cooled to room temperature under dry nitrogen and discharged into nitrogen-blanketed drums for storage.

EXAMPLE 7

A Large Scale Tests

This example describes a large scale test and demonstrates a preferred embodiment of the invention.

A small, commercial scale, catalytic reformer is to be operated at ultra-low sulfur reforming conditions using a platinum L-zeolite catalyst with a C$_6$–C$_8$ UDEX raffinate feed. The sulfur content of the feed contacting the catalyst is less than 5 ppb sulfur. The reactor system includes a sulfur converter/sulfur sorber, followed by four reforming reactors, their associated furnaces and furnace tubes. The reactors are made of 1¼ Cr, ½ Mo steel. The furnace tubes are made of 304 stainless steel.

Prior to catalyst loading, the reactors, the furnace tubes and the associated piping of the reactor system are treated with a reducible tin paint. Several coupons are also placed in the reactor system. The paint is applied to the coupons and to all reactor system surfaces that are to contact hydrocarbon feed at reforming or higher temperatures. The paint consists of 1 part 20% Tin Ten-Cem (manufactured by Mooney Chemical Inc., Cleveland, Ohio), 2 parts powdered stannic oxide, 2 parts finely powdered tin metal (1–5 microns in size) and isopropyl alcohol (for flowability). The Tin Ten-Cem contains 20% tin as stannous octanoate in octanoic acid. After the paint is applied to a wet thickness of about 3 mils, the coated reactor system is heated in a mixture of flowing hydrogen and nitrogen (1/9 ratio) for about 24 hours and then is maintained at about 1050° F. for about 48 hours. It is then cooled to room temperature. This procedure results in the painted surfaces being stannided (with iron and nickel stannides). The tin migrates to cover small regions (e.g., welds) which are not painted. The reactors and furnace tubes are inspected, and any chunks of tin that that can be readily removed are removed. The coupons are analyzed by petrographic microscopy; they show the presence of shiny microscopic tin balls.

In separate runs, the reduced halided platinum L-zeolite catalysts (6A and 6B) are loaded into stannided reactors and the start-up procedure of Example 1 is used. A raffinate feed is reformed to aromatics at temperatures between 800 and 1000° F. After 300 hours on stream, neither catalyst shows a decline in activity as measured by SOR temperature compared to what is expected for a halided catalyst in a non-stannided reactor system. Thus the pretreatment processes of Examples 6A and 6B are shown to be effective.

While the invention has been described above in terms of preferred embodiments, it is to be understood that variations and modifications may be used as will be appreciated by those skilled in the art. Indeed, there are many variations and modifications to the above embodiments which will be readily evident to those skilled in the art, and which are to be considered within the scope of the invention as defined by the following claims.

We claim:

1. A catalytic reforming process using a halided platinum L-zeolite catalyst in a metal-coated reactor system where, prior to catalyst loading and reforming, volatile halide acid is removed from the catalyst, said process comprising:
    a) providing a reforming reactor system having a metal coating;
    b) providing a halided Pt L-zeolite catalyst prepared by a method which includes removing volatile halide acid;
    c) loading said catalyst into said reactor system; and
    d) catalytically reforming hydrocarbons to aromatics.

2. The process of claim 1 wherein in step (b), the volatile halide acid is fixated.

3. The process of claim 1 wherein in step (b), the volatile halide acid is fixated by contacting with a scrubbing solution or by sorption onto a solid.

4. The process of claim 1 wherein the volatile halide acid is removed from a platinum-impregnated catalyst by reduction.

5. The process of claim 1 wherein in step (b), the volatile halide acid is removed by contacting a halided catalyst with hydrogen gas at a temperature between about 500° F. and 1000° F.

6. The process of claim 1 wherein said volatile halide acid comprises HCl.

7. The process of claim 1 wherein said metal coating comprises a metal selected from the group consisting of tin-, germanium-, antimony-, and aluminum-containing compositions.

8. The process of claim 1 wherein said metal coating comprises metallic tin, tin compounds or tin alloys.

9. The process of claim 1 wherein said metal coating has been freshly applied to at least a portion of the reactor system.

10. A catalytic reforming process using a halided zeolite catalyst in a metal-coated reactor system, said process comprising:
    a) providing a metal-coated reforming reactor system;
    b) providing a halided zeolite catalyst containing platinum which has been pretreated with hydrogen to remove HCl;
    c) loading the treated halided zeolite catalyst into the reactor system; and
    d) reforming hydrocarbons to aromatics.

11. The catalytic reforming process of claim 10 wherein the metal is tin.

12. The process of claim 10 wherein said HCl is fixated by contacting with a scrubbing solution or by sorption onto a solid.

13. A catalytic reforming process using a halided platinum L-zeolite catalyst, said process comprising:
    a) coating a reforming reactor system with a tin-containing paint and contacting the painted reactor system with a hydrogen-containing gas at 800–1150° F. to produce stannides;
    b) providing a halided Pt L-zeolite catalyst prepared by a process which comprises impregnating the catalyst with NH₄Cl and NH₄F and treating the halided catalyst with hydrogen to remove volatile halide acid;
    c) loading the treated halided Pt L-zeolite catalyst into the reactor system; and
    d) reforming hydrocarbons to aromatics under ultra-low sulfur reforming conditions of less than 10 ppb sulfur.

14. The process according to claim 13 wherein substantially all the volatile halide acid is removed.

15. The process of claim 13 wherein said volatile halide acid is fixated by contacting with a scrubbing solution or by sorption onto a solid.

16. A process for reducing catalyst contamination from a metal which was used to coat a reactor system, the process comprising contacting a halided catalyst with hydrogen-containing gas at a temperature above about 300° F. for a time sufficient to remove volatile halide acid; loading said catalyst into a metal-coated reactor system and converting hydrocarbons, wherein the metal of the metal-coated reactor system does not deactivate the catalyst.

17. The process according to claim 16 wherein the metal comprises tin.

18. The process according to claim 16 wherein the process is applied to a freshly metal-coated reactor system.

19. The process of claim 16 wherein said halide acid is fixated by contacting it with a scrubbing solution or by sorption onto a solid.

* * * * *